W. G. MILLIGAN.
LIGHTING AND SIGNALING APPARATUS FOR VEHICLES.
APPLICATION FILED FEB. 3, 1917.
1,290,633.
Patented Jan. 7, 1919.
6 SHEETS—SHEET 4.
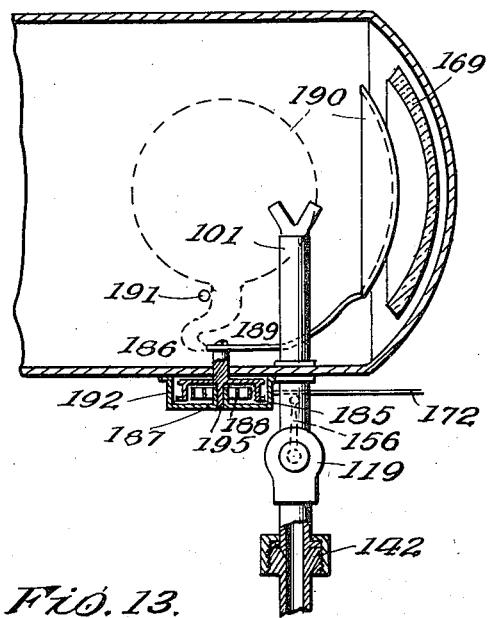
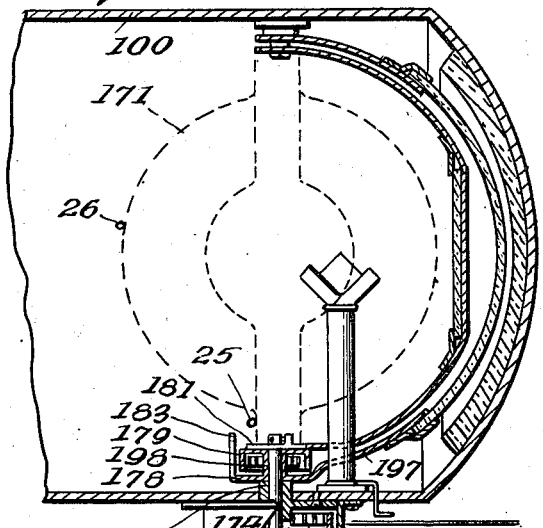
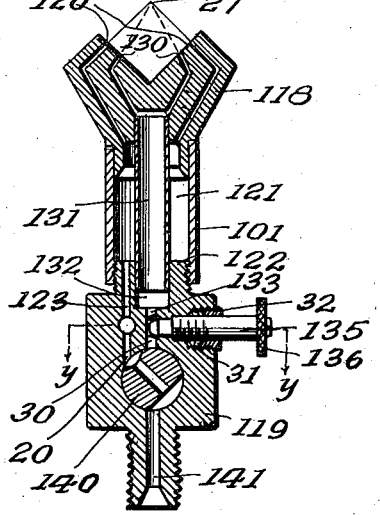
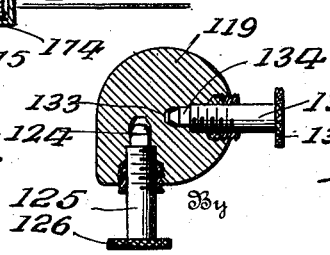

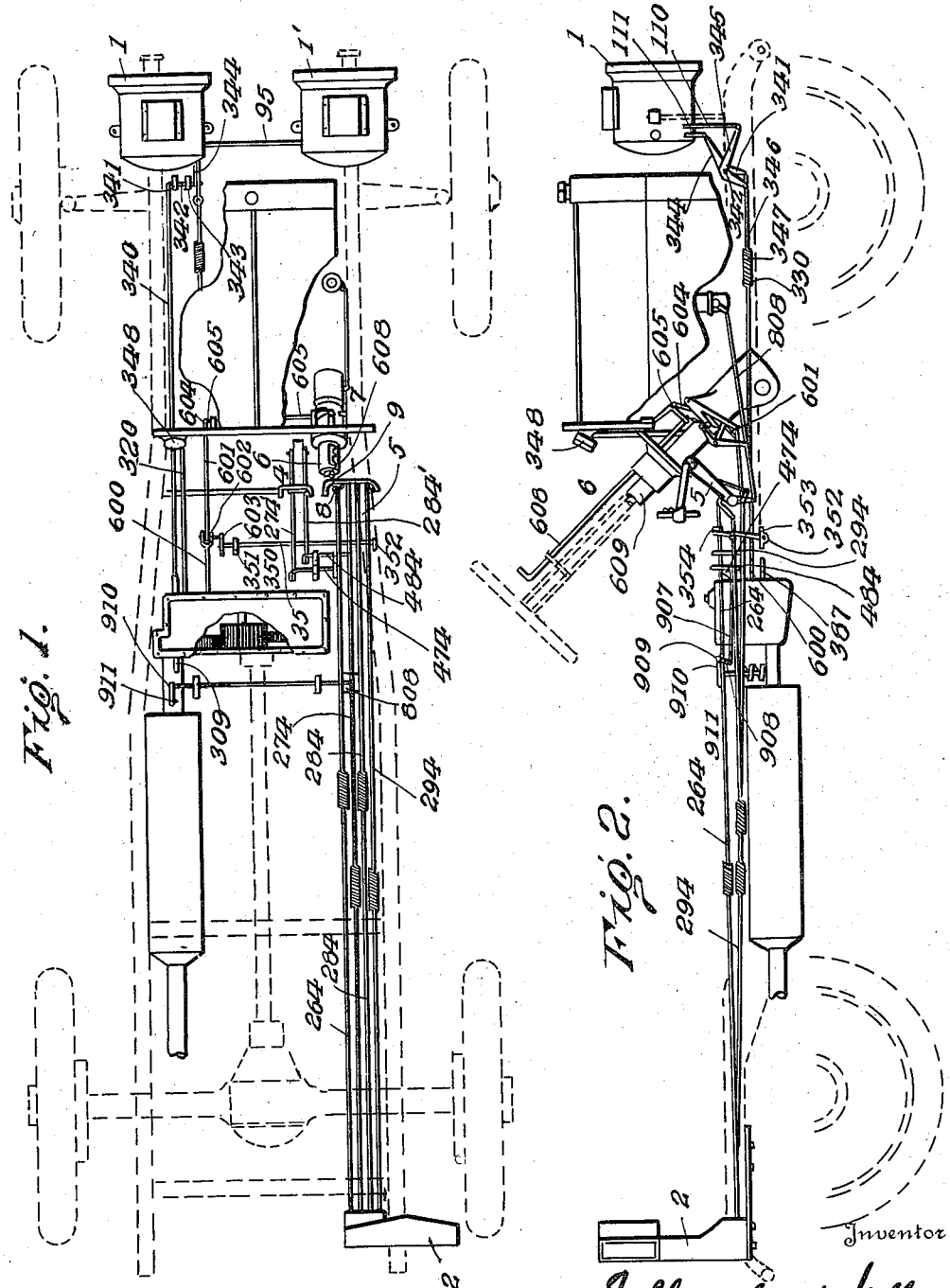

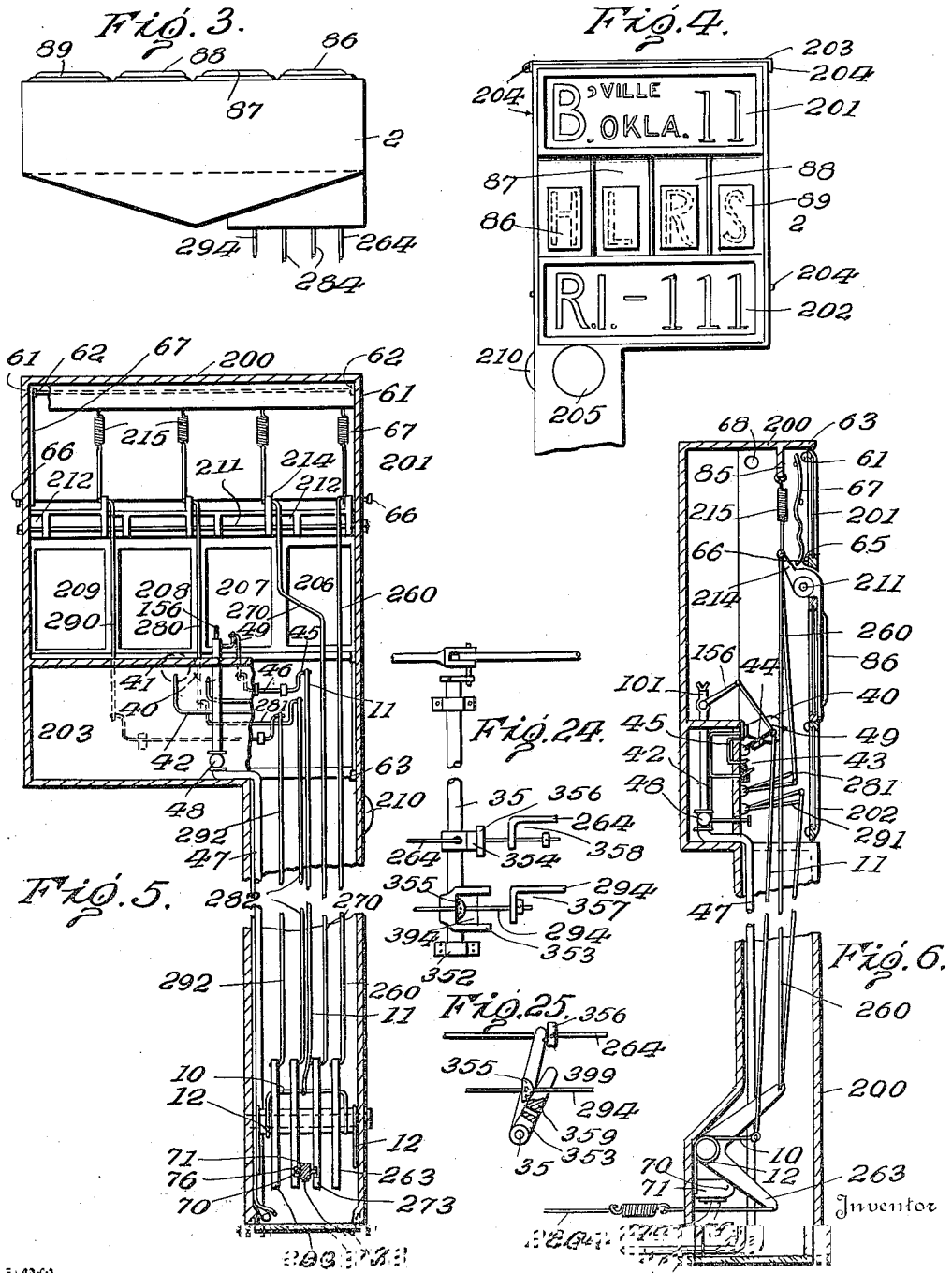

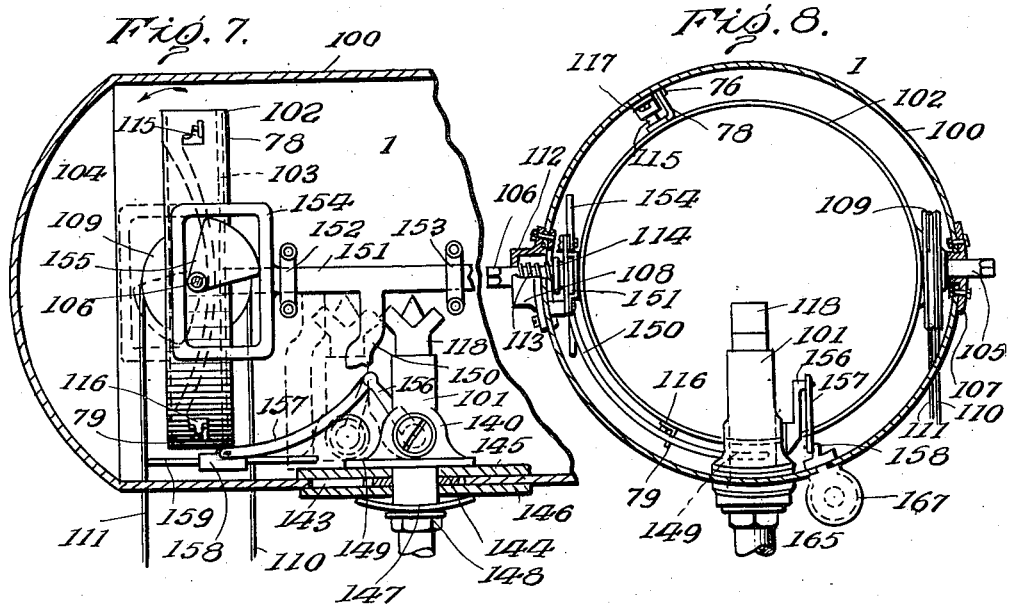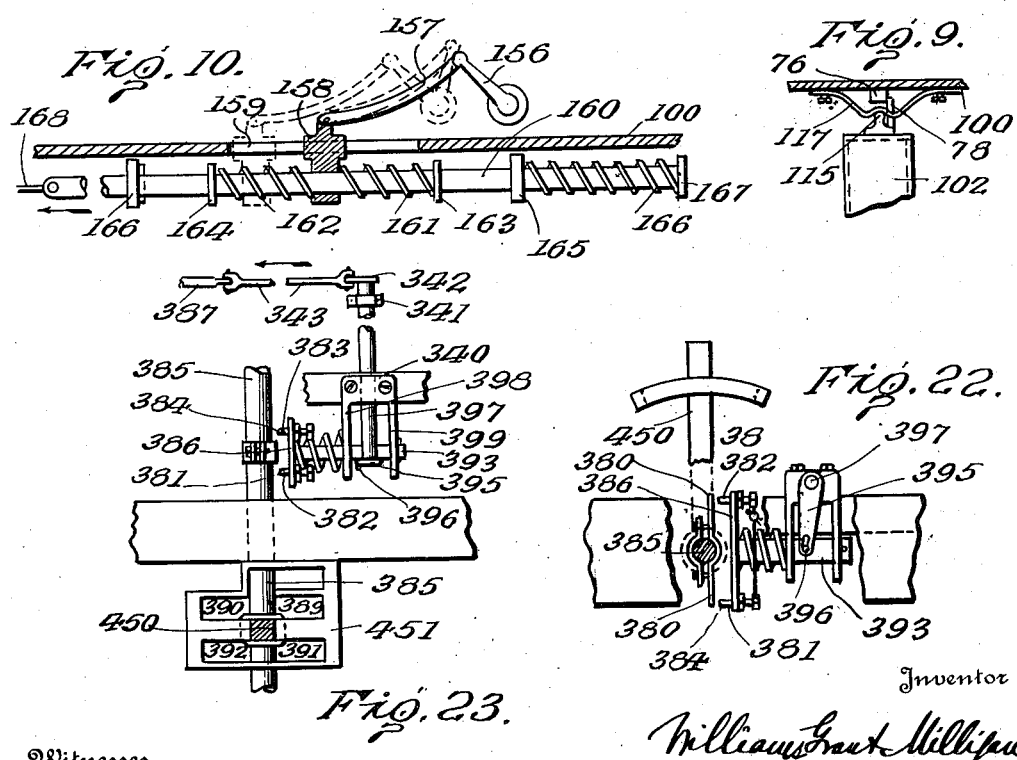

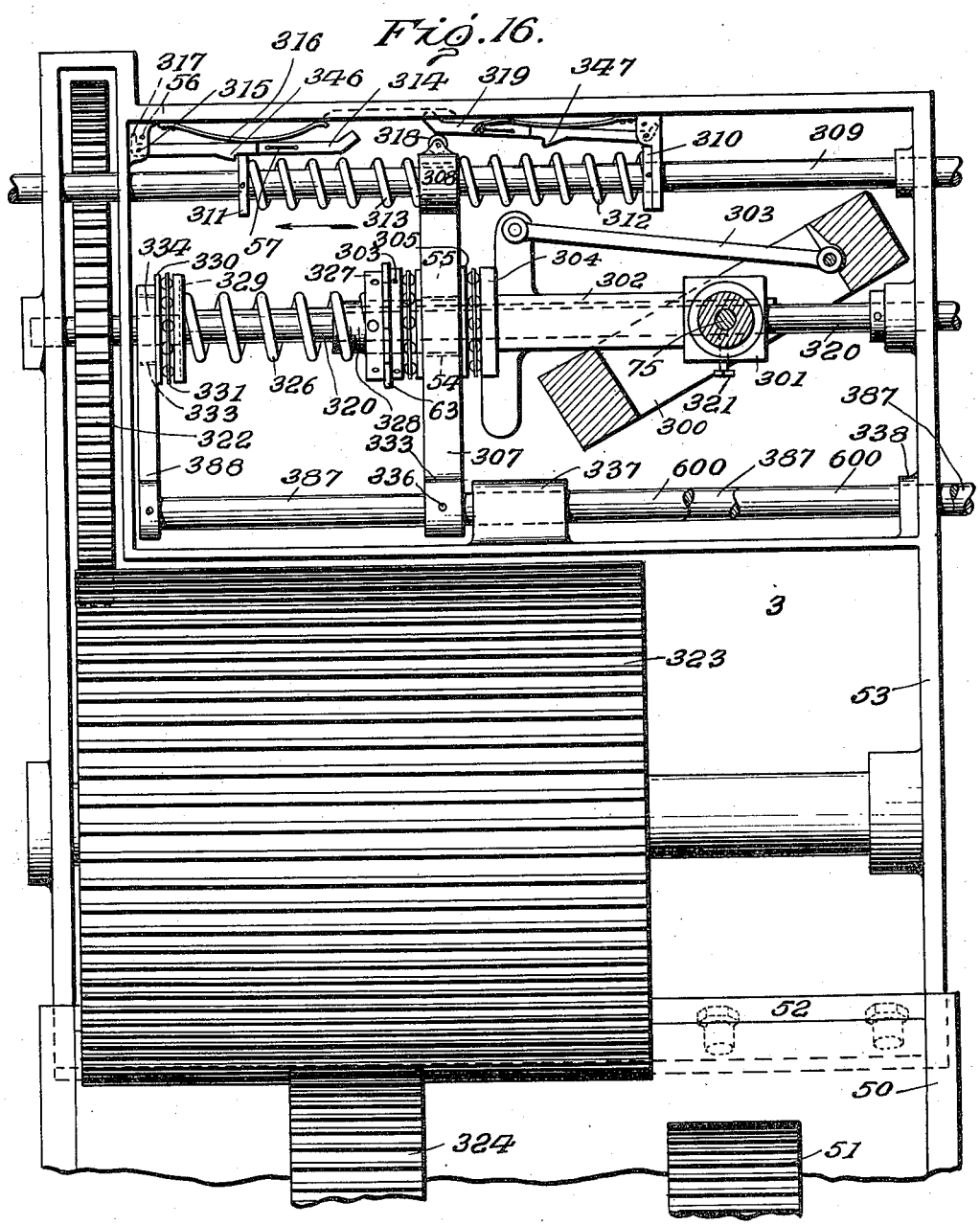

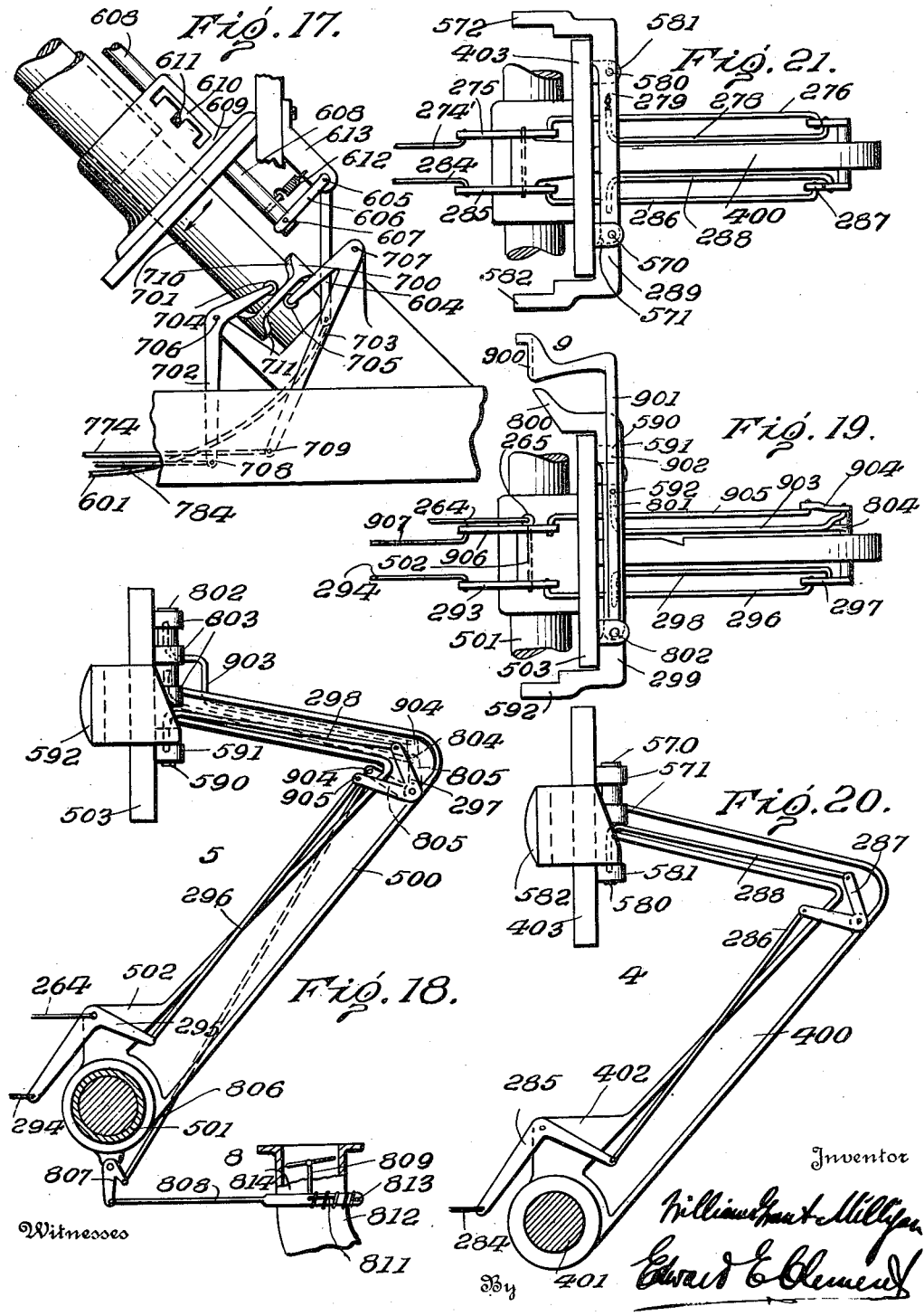

UNITED STATES PATENT OFFICE.

WILLIAMS GRANT MILLIGAN, OF AKRON, OHIO.

LIGHTING AND SIGNALING APPARATUS FOR VEHICLES.

1,290,633.  Specification of Letters Patent.  Patented Jan. 7, 1919.

Original application filed December 8, 1911, Serial No. 664,682. Divided and this application filed February 3, 1917. Serial No. 146,393.

*To all whom it may concern:*

Be it known that I, WILLIAMS GRANT MILLIGAN, a citizen of the United States, and resident of Akron, in the county of Summit and State of Ohio, have invented certain new and useful Improvements in Lighting and Signaling Apparatus for Vehicles, of which the following is a specification, reference being had therein to the accompanying drawing.

The present invention relates to motor vehicles, and is a division of my co-pending application Serial No. 664,682, filed December 8, 1911, now Patent 1,218,292 dated March 6, 1917, for a lighting and signaling system for vehicles. It has for its object the provision of certain improved control and signal means for motor vehicles, especially adaptable to systems such as that described in the above mentioned application.

Among the objects of my invention are the following:

(1) Head lights which may be used to project parallel beams or arranged to prevent a glare, either manually or automatically at different speeds as may be desired. (2) An automatic governor driven from the motor, but responding to changes in the speed of the car without regard to changes in the transmission gears. (3) A rear signal device which will give not only the proper number or numbers of the vehicle, and the usual danger signal, but also variable signals, indicating the movement and speed of the vehicle. (4) A combination steering column and manual light and signal control, with automatic direction signal control. (5) Combination throttle, brake and rear signal control with muffler cut-out if desired on the same foot lever without needless complication. (6) Manual control of the head lights, through movements of the burners. (7) Calibrating or adjusting means for the governor whereby its action may be modified and the operation of the lights and signals determined without regard to the speed.

It should be understood that the governor which I shall describe, is intended to be applied to the throttle control as well as the signal control, since the governors heretofore proposed have not to my knowledge regulated or controlled the power or signals in accordance with the speed of the car, but have been adapted rather to maintaining constant speed of the motor, which with changes in the transmission gears is of course useless in practice.

My invention is illustrated in the accompanying drawings in which—

Figure 1 is a plan view of an automobile equipped with my invention.

Fig. 2 is a side elevation of the same with parts removed.

Fig. 3 is a top plan view of the tail lamp.

Fig. 4 is a face view of the same.

Fig. 5 is a rear view of the lamp with part of the casing removed.

Fig. 6 is a vertical longitudinal section taken on the line $x-x$ of Fig. 5.

Fig. 7 is a side view of a form of signaling head lamp, with a part of the casing removed.

Fig. 8 is a front view of the same partly in section.

Fig. 9 is a fragmentary detail of the locking device for the revolving reflector.

Fig. 10 is a detail of the combined automatic and manual valve control for the burner shown in Figs. 7 and 8.

Fig. 11 is a longitudinal cross section of a modified form of head lamp using a rotating screen and automatic valve control for the burner.

Fig. 12 is a longitudinal cross section similar to that of Fig. 11 with the screen revolving mechanism attached to the burner support.

Fig. 13 is a further modification of a signaling head lamp using a combination of rotating screens and reflectors for modifying the light.

Fig. 14 is a longitudinal cross section of the high-low burner used in the various forms of the lamps shown.

Fig. 15 is a sectional view taken on the line $y-y$ of Fig. 14.

Fig. 16 is a plan view of the governor with part of the upper cover or casing removed.

Fig. 17 is a fragmentary view of the automatic control for the right and left signal and also part of the manual control of the speed indicating devices.

Fig. 18 is a side elevation of a brake pedal equipped with the foot controlling devices for indicating a change in the speed, for operating the exhilarator throttle and the muffler cut-out.

Fig. 19 is a plan view of the brake pedal shown in Fig. 18.

Fig. 20 is a side elevation of a clutch pedal equipped with a foot control of the course indicating devices.

Fig. 21 is a plan view of the clutch pedal shown in Fig. 20.

Fig. 22 is a fragmentary side elevation of the automatic calibrating device for the governor.

Fig. 23 is a top plan view of said calibrating device.

Fig. 24 is a top plan view of the automatic control for the speed indicating signals of the tail lamp.

Fig. 25 is a fragmentary side view of the same, partly in section.

Referring to Figs. 1 and 2, I have shown therein the various parts of my invention connected in their proper working relation to each other and positioned on an automobile indicated in outline and in dotted lines. It consists in general of the signaling head lamps 1 and 1' in which means are provided for modifying the light thereof; a tail lamp 2 provided with luminous signals for indicating the course and variations in speed of the vehicle, and also carrying rear signal lights and illuminated transparencies for one or more license numbers or the like; and an automatic control in the form of a governor 3 connected with such moving part of the vehicle as to have a substantially constant ratio of speed with that of the vehicle, which operates to actuate the modifying means of the headlights and the various luminous speed indicating signals of the tail lamp. The governor 3 is designed so as to operate the rod 309 to and fro upon changes in speed of the vehicle in such manner that when a predetermined speed is reached, the rod 309 is suddenly moved toward the rear pulling on the rod 340 and operating the modifying means of the lamps 1 and 1' through the intermediation of the crank arm 341, countershaft 342, arm 344, operating cord 111, and connecting link shaft 95. The governor also has control of the rod 600 which is also moved to and fro in constant varying ratio with the speed of the vehicle and operates to control certain signals in the tail lamp 2 to indicate a predetermined minimum or slow speed and subsequently a zero speed or halted condition, said zero or halted position being indicated at a reasonable predetermined time before its actual occurrence. The governor 3 also controls a suitable visual speed indicating device such as 348 by means of any suitable transmisson device such as the shafts 320, 349, and the usual bevel gears.

Figs. 7, 8, 9, and 10 show the preferred form of my signaling head lamp in which the light is modified by interchangeable reflectors in conjunction with a high-low burner. The interchangeable reflectors consist of a plane mirror 103 and a reflecting parabolic reflector 104 mounted at opposite sides of a revoluble frame 102, and the whole revolving on stub shafts 105 and 106 mounted on bearings 107 and 108 respectively. The plane mirror is preferably etched or frosted although it may be otherwise modified by coloring or by having parts blackened. For revolving the reflector frame 102 I provide a drum or pulley 109 integral with the stub shaft 105 to which are connected operating cords 110 and 111 which lead to the automatic controlling mechanism before mentioned and hereinafter described in detail. The cords 110 and 111 are attached to the drum 109 and overlap in such manner as to revolve the drum, and along with it the frame through 180°, with equal and constant leverage. A positive stop 76 is mounted on the casing 100 in such position as to be engaged on either side by the lugs 78 and 79 on the frame 102. In order to damp the momentum of said reflector frame, I provide, in addition to the positive stop, studs 115 and 116 mounted on said frame and adapted to engage successively the spring lock 117 at each half revolution of the reflector frame. The bearing 108 is provided with a recess 112 in which is nested a compression spring 113 bearing against a collar 114 on the stub shaft 106 with sufficient pressure to hold the frame 102 snugly in its bearings without undue friction. For maintaining the burner 101 within proper distance of the reflectors 103 and 104 without interfering with the movement thereof, I mount the burner slidably in the lamp and provide automatic shifting means therefor controlled by the movement of said reflectors. This shifting means consists of a sliding bar 151 mounted in bearings 152 and 153 and oscillated by means of a cam 155 rigidly connected to the stub shaft 106 acting on the inner surfaces of the frame 154. Depending from the arm 151 and at right angles thereto is a curved arm 150 which takes hold of a pin 149 mounted at the base of the burner 101. The burner 101 passes through a rectangular guide plate 144 bearing against the sides of a slot 143 in the casing of the lamp, said slot being covered on the inside by the shield 145 and on the outside by a similar shield 146 and the whole held in operative relation by means of a bow spring 147 and lock nut 148. The shank of the burner 101 is provided with one or more flat surfaces and the perforations in plates 144, 145 and 146, formed accordingly so that the burner will not turn in its mountings. The burner 101 is of a high-low type such as that shown in Figs. 14 and 15 of the drawings and which will be hereinafter described, but it suffices to state at this juncture that its illuminating power is controlled or modified by a valve 140 to which is connected an arm 156, adapted to be swung from one extreme position to the other at each movement of the burner by means of the link 157 pivotally conneced at one end to the arm 156 and at the other to a bearing 158 normally held in the position shown by the springs 161 and 162 which springs are sufficiently stiff to overcome the friction of the valve 140 and to operate the same. The bearing 158 is adapted to slide in a slot 159 and to be yieldably held at either extreme of said slot by means of a manually operated rod 160, more clearly shown in Fig. 10.

The operation of this lamp is as follows: Assuming that the parts are in their normal position as shown, i. e. with the plane mirror or reflector 103 presented to the burner and the burner in its extreme distant position therefrom, with the arm 156 held in the position shown, (which is the low power position), the lamp is at its minimum illuminating power and remains so until the governor actuates to pull the cord 111, whereupon the reflector frame 102 is caused to revolve through 180° and present the parabolic reflector to the burner. When the frame 102 turns, the cam 155 also rotates through 180° and moves the automatic burner shifting parts into the position shown in dotted lines, the arm 150 sliding the burner into the focus of the parabolic reflector 104. As the burner slides into the position shown in dotted lines, the valve 140 is rotated by means of arm 156 and link 157 to its high power position, thus increasing the quantity of light. This brings the lamp to its full illuminating power which condition is maintained until the governor releases the cord 111.

The burner may be maintained at either its minimum or maximum power by moving the bearing 158 to either extreme of the slot 159, as the case may be, and holding it there under slight spring tension so that it will slide with the burner without straining any of the parts. This is accomplished by the arrangement of parts shown in Fig. 10 which are mounted near the bottom of the lamp and shown in position in Fig. 8. The parts are here shown in their normal position, in which the bearing 158 is held stationary intermediate the ends of the slot 159 which allows the valve 140 to operate automatically as described. However, when it is desired to maintain the burner at its minimum power, regardless of its position or of the movements of the frame 102, the rod 160 is pulled in the direction of the arrow by means of the cord 168 until the collars 163, 164 and 167, which are fixed to the rod 160, assume the position indicated in dotted lines. This compresses the spring 161 sufficiently to hold the bearing 158 in the position indicated in dotted lines so long as the burner is in the position as indicated in dotted lines in Fig. 7, and by means of the link 157 and arm 156 holds the valve at the low power position. When the burner slides out into the position shown in solid lines in Fig. 7, the bearing 158 is pulled against the tension of spring 161 to the center of the slot and the parts 140, 156, 157 and 158 are again brought into the position shown in full lines in Figs. 7 and 10. When it is desired to maintain the power of the burner at maximum, the cord 168 is released which allows the spring 166 to retract the rod 160 until the collar 163 engages the bearing 165. This moves the bearing 158 to the extreme forward end of the slot 159 and at the same time throws the arm 156 over to the high power position. When the burner slides back into the position shown in dotted lines in Fig. 7, the bearing 158 is pushed back by the link 157 and valve arm 156, against the tension of spring 162 into the central position, the link 157 holding the arm 156 over in the high power position. The rod 160 may be held in any of the three positions described by a suitable means not shown for holding the cord 168.

Fig. 11 shows a modified form of light control for use in my system adapted to be added to any of the existing types of head lamps. It comprises a spring drum 185 within a casing 192 and provided with a stub shaft 195 which turns in a bearing 187 projecting upwardly from the casing and is integral therewith. The spring 188 is fastened at one end to the drum 185 and at the other to the bearing 187. Projecting upwardly from the drum 185 and integral therewith is a stub shaft or post 187 to which is fastened the arm 189 of a semitransparent screen 190. In conjunction with the above I use a variable or high-low burner, preferably of the type shown in Fig. 14, and connect the valve turning arm 156 with the operating cord 172 which is wrapped partly around and fastened to the drum. In operation the cord 172 is connected with the governor mechanism in the same manner as the cord 111 in Fig. 7, and under normal condition assumes the position as shown, in which the burner is turned down to its minimum illuminating power. When the predetermined maximum speed is reached, the governor actuates to pull the cord 172 sufficiently to revolve the drum through 90°, thus moving the screen 190 into the position indicated in dotted lines and against the limiting stud 191. Simultaneously with the movement of the screen the valve arm 156 is pulled over so as to bring the burner to its maximum illuminating power.

In Fig. 12 I have shown a modified form of the device shown in Fig. 11. In this form the screen rotating mechanism is mounted on the burner support and is capable of vertical, and lineal and angular horizontal adjustment by means of a collar 196, sliding rod 193, and set screw 194.

Fig. 13 is an elaboration of the form of light modifying device shown in Figs. 11 and 12 and consists in the combination of a rotating light modifying screen 171 and a rotating plane mirror 170. The screen 171 is preferably made of etched or frosted glass. However, I further contemplate making it in the form of a lens to modify the effect of the reflector 169, or of colored glass. The screen 171 may be replaced by an etched or frosted reflector. The rotating light modifying members are operated by a spring drum 173 rigidly mounted at the lower end of the shaft 176 which revolves in a bearing 177 fastened to the lamp casing 100. The spring 175 has one end fastened to the drum 173 and the other fastened to the downwardly projecting portion of the bearing 177. Loosely mounted on the shaft 176 near its upper end is a disk 178 to which is attached the screen 171 through the medium of an arm 197. A cap 179 is positioned near the upper end of the shaft 176 and rigidly connected to a disk 181 which is mounted so as to revolve loosely on the shaft and held in place by means of a shoulder bearing 198 integral with the disk 178. The downwardly extending flange of the cap 179 surrounds the upwardly extending bearing 198, thus forming a housing for the spring 180 which is connected at one end to the flange of the cap 179 and at the other to the bearing 198. The disks 178 and 181 are provided with pins 183 and 182 respectively which extend upward into the path of a pin 184 extending radially from the shaft 176. The spring 175 is so connected as to hold the reflector 170 in the position shown by virtue of the pin 184 bearing against the pin 182, the burner 101 acting as a stop for the arm 199 of the reflector, while the spring 180 is connected so as to normally tend to rotate the members 170 and 171 in opposite directions. It will thus be seen that so long as the arm 199 is held against the burner, the arm 197 will also be held there through the action of spring 180. For operating this form of lamp, the governor mechanism is so modified and adjusted in a manner hereinafter described, that it will pull different lengths of the cord 172 at two different predetermined speeds. When the first speed is reached, the cord is pulled sufficiently to rotate the drum 173 through 90° which causes the pin 184 to move away from the pin 182 and allows the reflector 170 to move into the position indicated in dotted lines where it is held from further movement by a stop 25. At this juncture the members 170 and 171 are held apart and against their respective stops 25 and 101 by the spring 180, and the pin 184 is in contact with the pin 183. When the second predetermined speed is reached, the cord 172 is pulled further and this time sufficiently to rotate the drum 173 through an additional 90° whereby the screen 171 is moved against the tension of the spring 180 into the position shown in dotted lines through the medium of pins 184 and 183. A stop 26 is provided for the member 171. The reverse cycle of operations takes place upon retrograde movement of the governor mechanism.

In Figs. 14 and 15, I have shown detail views of my improved high-low burner which consists of a double burner tip 118 of lava or other highly refractory material, in which are arranged two sets of jet holes 120 and 130. The holes 120 are so positioned as to produce a large flame centered at the point 27, while the holes 130 are designed to produce a relatively small flame also centered at the point 27 or in proximity thereto so that either flame will act as a pilot for the other. The two sets of holes 120 and 130 are supplied through separate passages 121, 123 and 131, 133 and ports 20 and 30 respectively, and controlled by a three way valve 140 intermediate said channels and a source of supply 141. The outlet opening in the valve 140 is so arranged as to connect with the port 30 before cutting off from the port 20 when moving in a clockwise direction, so that the passage 133 will be open through to the source of supply before the closure of port 20, the reverse operation taking place when the valve is subsequently turned counterclockwise. It will thus be seen that when the valve is in the position shown, illuminating fluid such as acetylene gas will flow from the source of supply through the passage 141, valve 140, port 20, passages 123, 121 and out through openings 120 producing a flame of high candle power substantially centered at the point 27. When the small flame is desired, the valve is rotated clockwise and in so moving opens the port 30 before closing port 20 whereby gas is permitted to flow through port 30, passages 133, 131 and out of openings 130 where it is ignited from the flame first mentioned and the valve then continuing its movement closes the port 20 which extinguishes the high power flame. Further movement of the valve would effect the extinction of both flames but it is preferred to use a master valve of any existing type, for effecting the latter result. It is necessary in a burner of this type that the two flames be separately adjustable, and for this purpose I provide valves 124 and 134 in the passages 123 and 133 respectively. These valves are identical in structure and I will therefore describe in detail the valve 134 of which two views are shown. It consists of a cone intersecting the cylindrical passage 133, and so proportioned as to be capable of closing the same The cone is formed on the end of a shaft 135 provided near this end with threads which take into the base 119, and at the other extreme end is secured a knurled head 136. A stuffing box 31 is countersunk within the base 119 and provided with a threaded gland 32. Adjustment is accomplished by turning the knurled head 136 which varies the distance between the sides of the cone and the conical recess in the passage 133. Various modifications of the burner here described may be made and among those contemplated are to make the burner tip of metal with lava jets, and to provide adjusting valves such as 124 and 134 on the body of the burner in order that such burner may be used in any of the existing types of lamp.

Fig. 16 shows the governor mechanism forming part of my system and is here shown with the cover removed and connected with the transmission gearing of an automobile. The governor casing 53 may be connected with the transmission casing 50 in any suitable manner and according to the particular type of automobile to be equipped, however, I have shown it here as being bolted onto the transmission case and an opening 52 made therein sufficient to allow the idler 323 to enter and mesh with a shifting gear 324 of the transmission. The gyroscope wheel 300 of the governor is mounted to turn on a shaft 75 bearing in a collar 301 which is rigidly connected to the shaft 320 by a set screw 321. A sliding sleeve 302 is feathered on the shaft 320 and oscillated by the governor wheel through a link 303.

The motion of the sleeve 302 is transmitted to a yoke 307 provided with downwardly extending forks 54, 55, which straddle said sleeve. Thrust bearings are provided consisting of the ball bearing rings 306 bearing between the washers 305 and the collar 304 and nut 303. The collar 304 is integral with the sleeve 302 while the nut 303 is adjustable on the threaded portion 328 of the sleeve 302 and held in adjustment by means of a lock nut 63. The governor is calibrated by means of a spring 326 which bears at one end against an adjusting nut 327; and at the other against a flanged sleeve 324 feathered on the shaft 320 and limited in its outward movement by a stop pin 334. The end of the arm 308 of the yoke 307 is enlarged and perforated so as to slide loosely on the rod 309 and alternately compress the springs 312 and 313. The springs 312 and 313 also bear against collars 310 and 311, respectively, said collars being rigidly held on the rod 309 by set screws or other suitable means. 314 and 319 are releasing levers having detents 346 and 347 which engage the upper portion of the collars 311 and 310 respectively. The releasing levers are held inwardly toward the collars under tension of leaf springs 316 and limited in their inward motion by any suitable stop such as the toe 317 and stud 56 arranged near the pivot pin 315. The levers 314, 319 are bent at their free ends to form cam surfaces which enable them to be tripped by a roller 318 on the arm 308. The levers are adjustable in length by means of the slot and screw adjustment 57. Motion is transmitted to the governor shaft 320 through gears 322, 323 and 324. The gear 324 is one of the shifting gears of the transmission which revolve at a constant ratio with the rear axle, this causing the governor also to revolve in constant ratio with the rear axle. The gear 323 is an idler and made long so as to be always in mesh with the shifting gear 324.

The arm 335 of the yoke 307 is rigidly connected to the end of the rod 600 which slides in bearings 337 and 338 and projects through the casing for purposes to be hereinafter described.

Normally the parts of the governor mechanism are in the position shown and as the automobile increases its speed from zero to maximum, the gyroscope wheel 300 gradually assumes a position at right angles to the shaft 320, the various intermediate positions representing different speeds. This movement of the wheel 300 causes the yoke 307 to travel in the direction of the arrow compressing the springs 326 and 313 until the roller 318 strikes the lever 314 whereupon the detent 346 is thrown out of engagement with the collar 311 which allows the rod 309 to be suddenly pushed in the direction of the arrow under tension of the spring 313, the wall of the casing serving as a stop for the collar 311 and thereby limiting the movement of the rod. This movement of the rod 309 carries the collar 310 just beyond the detent 347 where it occupies a position in relation to the detent similar to that which the collar 311 normally assumes in relation to the detent 346. Upon a decrease of speed, the spring 326 operates to restore the governor wheel to the position shown and the yoke 307 is carried back compressing the spring 312 against the collar 310 which is held by the detent 347 until the roller 318 strikes the lever 319 whereupon the detent is thrown out of engagement with collar 310 and the rod caused to suddenly move back into the position shown. It is obvious that by suitable adjustment of the release levers 316, 319, collars 311, 312 and spring 326, the rod may be thrown at any predetermined maximum and minimum speeds. When it is desired to operate the modified form of lamp shown in Fig. 13, an additional pair of release levers like 314 and 319 are provided and all four so adjusted as to give the rod 309 two separate movements in each direction, each movement occurring at a predetermined speed of the automobile. In order to have predominating manual control of the governor, I provide means operating the rod 600 whereby the yoke 307 may be moved to and held in either of its extreme positions. This means is shown in Figs. 1, 2 and 17 and comprises a manually operated rod 608 adapted to slide in a socket 609, and to be locked in either of three different positions by means of a triple bayonet slot 610 and bolt 611. A spring 612 is attached at one end to the bearing 613 and at the other to a pin extending radially from the rod 608, which tends to turn the rod so as to slide the bolt 611 into one of the holding slots. Motion is transmitted from the rod 608 to the rod 600 (Fig. 1) by way of the pin 607 (Fig. 17) crank arm 606, countershaft 605, crank arm 604, rod 601, and the pin 603 (Figs. 1 and 24). The pin 603 passes through an elongated eye in the rod 601 in order that there will be lost motion between the two. This lost motion is adjusted so that when the rod 608 is in the position shown in Fig. 17 with the bolt 611 resting in the middle notch, the movement of rod 600 will not be affected. However, when the rod 608 is moved down until the bolt 611 engages the lower notch, the rod 601 is pulled sufficiently to take up the lost motion and hold the rod 600 and yoke 307 in the position shown in Fig. 16; which holds the governor at zero position regardless of the speed of the automobile. Similarly, when the rod 608 is raised until the bolt 611 engages the upper notch, the rod 600 is pushed over into the other extreme position which holds the governor at the position of maximum speed regardless of the actual speed of the automobile. It is thus seen that the operator in emergencies is not embarrassed by a purely automatic lighting system beyond intelligent control, and when it is required to prevent the operator from changing the speed indication at will by such manual control except upon emergency, the rod 608 may be held in normal position by a breakable seal such as that shown in Fig. 22.

Referring to Figs. 3, 4, 5 and 6, I have shown therein various detail views of the tail lamp indicated at 2 in Figs. 1 and 2. 200 is the casing of the lamp. 201 and 202 are transparencies bearing license numbers and 203 is a cover or blind that may be used to obscure either of said transparencies and held in position by pins 204 which take into perforations in said cover. The window 201 is made to swing on stub shafts 61 which project inwardly from the sides of the casing and bear in the perforated lugs 62 integral with the window frame. Similar perforated lugs are provided at the lower corners of the window frame which serve as sockets for the transom bolts. Damping springs 67 are mounted on the inner sides of the casing at either end of the window so as to bear against both the hinge lugs 61 and sockets 65.

The lower window 202 is similarly hinged and bolted except that it is hinged at the lower corners and bolted at the upper. This window is also provided with damping springs not shown.

210 and 205 are colored transparencies which serve as the usual rear signals. The windows 208, 207, 209 and 206 display traffic signals "Right," "Left," "Slow" and "Halt," respectively. Such signals may be indicated in various ways as by a color code or system of conventional marks more readily distinguishable than letters, but I prefer to indicate them by bold initial letters "R," "L," "S" and "H." The windows 206, 207, 208 and 209 are provided with shutters 86, 87, 88 and 89 respectively. These shutters are swung on a common shaft 211 supported in bearings 212, and are operated by means of arms 214. The shutters are held closed by springs 215 attached at one end to the flange 85 and at the other to the arms 214. The shutter 86 (see Fig. 6) is controlled by the rod 264 so that when said rod is pulled the motion is transmitted by way of bell-crank lever 263 and rod 260 to arm 214 which causes the shutter 86 to swing outward on the shaft 211 and reveal the transparency bearing the letter "H." The shutters 87, 88 and 89 are similarly operated by the rods 274, 284 and 294 respectively excepting that for operating shutters 88 and 89 the motion is off-set or stepped over into a different plane by crank rods 281 and 291 respectively. Any well known system of illumination may be used for the lamp such as gas or electricity. I prefer, however, to use a combined illuminating system of gas and electricity controlled in the manner shown and which I believe to be original. It consists of the combination of electric lights 40—41 and a high-low acetylene burner 101 preferably of my improved type hereinbefore described, operated automatically to increase the illumination of the lamp upon the displaying of any one or several of the traffic signals.

Ventilation is provided for the burner 101 through the opening provided for the operating rods at the base of the lamp, and the outlet hole 68 in the outer side near the top, said outlet hole being so placed in order that the heat issuing therefrom will not injure the body of the vehicle. A dam in the form of a depending flange 85 is provided intermediate the outlet hole 68 and the front of the lamp so as to divert the heated gases away from the windows. Electricity is supplied to lights 40 and 41 from any suitable source by the cable 42, the light 41 being connected directly with the cable terminals so as to glow steadily, while the light 40 is connected in series with the contact members 43 which are adapted to be electrically connected by a bridging member 44 carried by and insulated from the arm 45 of the crank rod 46. The burner 101 is supplied through a pipe 47 said supply being controlled by a valve 48. The valve arm 156 of the burner 101 and the arm 45 are made to move in unison by means of the crank rod 46 and link 49 so that when the several parts are in the position shown the burner will be turned to low candle power and the light 40 extinguished. The arm 45 is connected through a link or rod 11 to the horizontal bar 10 arranged transversely of the bell-cranks 263, 273, etc., immediately beneath the upper members of the same and normally held in the position shown under tension of the coiled ends 12 which bear against the casing of the lamp. When any of the rods 264, 274, etc., are pulled to operate the shutters, the upper arm of the bell-crank to which that rod is connected engages the bar 10 and pulls it downward against the tension of coils 12. This downward movement of the bar 10 pulls on the rod 11 which operates the arms 45 and 156 so as to complete the circuit of the lamp 40 and switch on the large flame of the burner 101. Coil springs are inserted on the rods 264, 274, etc. to take up any extra motion and to prevent strain.

In order to prevent the "right" and "left" signals from being actuated at the same time I provide a locking means in the form of a bolt 70 sliding in the bearing 71 and adapted to be actuated by the cams 75 and 76 on the bell-cranks 273 and 283, respectively. The bolt 70 is normally centered in the bearing 71 by means of a pin 73 fixed in the bolt and sliding in an elongated eye slot, the said pin being normally held in the center of the slot by a double leaf spring 74. This locking device operates as follows: When the bell-crank lever 283 is operated the cam surface 76 on the lower arm thereof strikes the bolt 70 and pushes it farther across the path of the lower member of the bell-crank 273 and beyond the control of the cam 75 thereon, thus holding the bell-crank 273 in its inoperated position so long as the lever 283 is held down. The reverse operation takes place when the bell-crank 273 is operated first. It will be noted that this device not only prevents one of the "right" and "left" signals from being operated subsequently to the other and before the other has been restored, but also prevents their simultaneous operation.

The means for automatically operating the "right" and "left" signals of the tail lamp is shown in detail in Fig. 17. It comprises the bell-crank levers 702 and 703 pivoted at 706 and 707 adapted to be operated by a cam ring 700 concentrically mounted on the steering column or shaft 701 and rigidly connected thereto so as to revolve therewith. The upper members of the bell-cranks are provided with anti-friction rollers 704 and 705 while the lower members are connected at 708 and 709 to the rods 784 and 774 of the "right" and "left" signals, respectively. The cam surfaces 710, 711 are so formed and positioned in relation to the rollers that the roller 704 will rise immediately when the shaft 701 is revolved in the direction of the arrow while the roller 705 remains in the position shown during such part of the revolution as is determined by the length of the straight portion of the cam 711 on which it now rests and upon a reverse direction of rotation of the shaft 701, the roller 705 is immediately moved downward while 704 remains in the position shown during a part of the revolution as determined by the length of the straight portion of the cam 710 on which it now rests. The operation of this device is as follows: When the operator of the automobile turns the steering wheel to the right, the shaft 701 rotates in the direction of the arrow, and as before described, causes the roller 704 to rise which rocks the bell-crank 702 so as to pull on the rod 784, whereby the "right" signal is actuated as hereinbefore described, the bell-crank 703 remaining stationary. Similarly when the steering wheel is carried to the left, the shaft 701 revolves in a direction opposite to that of the arrow thereby causing the cam 711 to ride over the roller 705, pushing the same downward and rocking the bell-crank 703 so as to pull on the rod 774 which operates the "left" signal in the manner hereinbefore described.

The auxiliary foot controls for the "right" and "left" signals are mounted on the clutch pedal and are shown in detail in Figs. 20 and 21 and in their relative position to the whole system in Figs. 1 and 2. Referring to Figs. 20 and 21, the "right" and "left" control toe pieces 582 and 572 respectively are mounted on the tread 403 of the clutch pedal 400 so as to project beyond the plane of the tread in such manner as to be readily operated without the operator removing his foot from the tread of the clutch pedal. The toe piece 582 is formed on the end of a lever 289 pivoted at 580 in the bearings 581. Motion is transmitted from the lever 289 by way of rod 288, bell-crank 287, rod 286, bell-crank 285, rod 284 and crank rod 484 (Figs. 1 and 2) to the operating rod 284 of the "right" signal which operates the same as before described. The toe piece 572 (Figs. 20 and 21) is formed on the free end of the lever 279 which is pivoted at 570 in the bearings 571. Motion is transmitted from the lever 279 by way of rod 278, bell-crank 277, rod 276, bell-crank 275, rod 274' and crank rod 474 (Figs. 1 and 2) to the operating rod 274 of the "left" signal which operates the same as before described. Suitable lost motion is provided intermediate the foot control and the automatic control in order that one will work independently of the other without straining the parts.

In Figs. 24 and 25 I have shown the automatic means for operating the traffic signals "Slow" and "Halt" of the tail lamp 2. It consists of a pair of levers 353, 354 rigidly connected to the shaft 35 and staggered in relation to each other as shown in Fig. 25. The shaft 35 is connected to the governor rod 600 by means of the crank arm 350, pin 603 and the bifurcated member 602, whereby the shaft 35 is caused to gradually rotate in the direction of the arrow as the automobile increases its speed from zero to maximum. When the automobile is standing still, the parts are in the position shown, that is with the rod 264 held back in its operative position by engagement of the arm 354 with the collar 356, which collar is rigidly connected to the rod 264, whereby the "halt" signal is held open, or so that the letter "H" is revealed. The letter "H" being white on a red ground this giving a color code signal at a distance. As soon as the automobile is started in motion, the governor pulls on the rod 600, rotating the shaft 35 in the direction of the arrow which pulls the arm 354 away from the collar 356 thus releasing the rod 264 and allowing the shutter 86 of the "halt" signal to drop. As the automobile attains normal speed, the arm 353 moving in the direction of the arrow, passes the collar 355 which is rigidly connected to the rod 294, said collar being beveled on one side so as to be pushed upward by the cam 394 in the crotch of the fork 353 as the fork passes thereunder without straining the working parts of the governor. When the automobile again slows down, shaft 35 is rotated in the opposite direction of the arrow, carrying the arm 353 into the position shown, during which movement of the arm 353 the flat portion 359 of the cam engages the collar 355 which pulls the rod 294, thereby operating the "slow" signal in the lamp 2. The "slow" signal remains displayed until just before the automobile comes to a standstill, when the shaft 35 reaches the extreme position as shown and in so doing rotates the arm 353 and cam 359 out of engagement with the collar 355, releasing the rod 294 and rotating the arm 354 into engagement with the collar 356 which pulls on the rod 264 thus restoring the "slow" signal and revealing the "halt" signal. Further automatic control of the "halt" signal is obtained by connecting the rod 264 through a suitable lost motion link 358 to the lug 502 of the brake pedal 5, Figs. 1, 18 and 19, in such manner that upon operation of the brake, the rod 264 is pulled, which operated the "halt" signal in the same manner as before described. In addition to the automatic control of the "slow" signal, I provide an auxiliary foot control on the brake pedal 5, which is shown in detail in Figs. 18 and 19 and comprises a lever 299 operated by a toe piece 592. Motion is transmitted from the lever 299 by way of the rod 298, bell-crank 297, rod 296, and bell-crank 295 to rod 294. Suitable lost motion such as that shown at 357 in Fig. 24, is placed intermediate said foot control and the automatic control so that either control may be operated independently of the other. In order that the foot control just described may be used without interfering with the usual foot control of the throttle and muffler cut-out, I mount such control on the brake pedal in the following novel manner: The throttle toe piece 800 is formed at the end of a lever 801 pivoted at 802 in the bearings 803. Motion is transmitted from the lever 801 by way of rod 804, bell-crank 805, rod 806 and bell-crank 807 to the usual throttle-control rod 808. The throttle-control rod 808 is adapted to operate the throttle valve by means of the arm 809, pin 810, and elongated eye 811 and spring 812. The spring 812 bears against the pin 810 at one end and at the other against an abutment pin 813, the tension of spring 812 being such as to operate the throttle valve without further compression unless said valve is held open by the usual hand control. In such case the spring 812 is compressed when the rod 808 is pulled so as to permit the pin 810 to slide in the elongated eye 811 without moving the arm 809. A further advantage of this method of throttle control is that when the brake is applied, the throttle is automatically closed by virtue of the bell-crank 807 being connected on the brake pedal and at a point in such relation to the center of rotation of the pedal and the throttle lever 809, that said bell-crank 807 will be moved bodily in such direction and to such an extent as to close the throttle regardless of the position of the toe piece 800 in relation to the pedal. It is thus seen that even though the operator should become confused in such an emergency as requires a sudden stop and press down on the throttle control 800 so as to operate it beyond its limit of movement, the brake would be operated, and in so operating would automatically close the throttle as above described. Mounted on the brake pedal 5 and in proximity to the toe piece 800, is a muffler cut-out toe piece 900, which is so mounted that both of said toe pieces may be simultaneously depressed if desired. The toe piece 900 controls the muffler cut-out over the following system of transmission: Motion is transmitted from the toe piece 900 by way of pivot 902, rod 903, bell-crank 904, rod 905, bell-crank 906, rod 907 (see Figs. 1 and 2), crank arm 908, counter shaft 909, and arm 910 which operates to push downward upon the usual muffler cut-out device 911, Figs. 20 and 21.

Figs. 22 and 23 illustrate an automatic governor calibrating device whereby the governor may be geared with the motor or some part which moves in constant ratio thereto, by any well known means of transmission, and still be made to actuate its parts in constant ratio to the rear axle. This device operates to automatically change the calibration of the governor upon each change of speed through the shifting gears. This adjustment is accomplished by pulling on the rod 387 (see Fig. 16) which compresses the calibrating spring 326 through the intermediation of the arm 388, flanged collar 330, ball-bearing ring 331 and collar 329. The device consists in detail of a plate 380 rigidly connected to the sliding rod 385 of the gear shift, and adapted to bear against the adjustable studs 381, 382, 383, and 384. These studs are adjustably secured by means of lock nuts, to a face plate 386 secured to the end of the bar 393 adapted to slide in the bearings 398, 399. Motion is transmitted from the bar 393 by way of pin 396, crank arm 395, counter shaft 397, crank arm 342 and link 343 to the calibrating rod 387. The face plate 386 is normally held in the position shown by a suitable retractile spring 394 which abuts against the bearing 398. The studs 381, 382, 383 and 384 are so positioned in relation to the plate 380 that when the gear shifting lever 450 is thrown over into any of the several slots 389, 390, 391 and 392 in the axle plate 451 for changing the ratio of speed between the rear axle and the motor, the plate 380 engages successively the studs 383, 384, 382 and 381, respectively. These studs are so adjusted is relation to the plate 380 and according to the various ratios of speed provided in the transmission and gear shifting device that at each shift the bar 393 is pushed against the tension of the spring 394 through such a distance as will cause sufficient compression of the calibrating spring 326 to change the calibration of the governor, and compensate for the difference in speed between the motor and the rear axle. When the gear shifting lever is thrown over into the first speed slot 389 the upper portion of the plate 380 engages the stud 383, pushing the face plate 386 and bar 393 against the tension of the spring 394. The motion of the bar 393 is transmitted to the governor in a manner as before described and increases the tension of the calibrating spring sufficient to compensate for the change in speed.

When the gear shift lever 450 (Figs. 22 and 23) is rocked into the second speed slot 390, the lower portion of the plate 380 engages the stud 381 which is so adjusted that the bar 393 is pushed against the tension of the spring 394 through such a distance that the calibration of the governor will be changed to compensate for the change of the ratio of speed between the motor and the rear axle. Similarly when the lever 450 is rocked into the third speed slot 391 the upper portion of the plate 380 engages stud 382 which is so adjusted as to effect further adjustment of the governor spring 326, and when the arm 450 is finally moved into the fourth speed slot, the lower portion of the plate 380 engages the stud 381 which lowers the tension of the spring 326 to such a degree that the governor wheel 300 (Fig. 16) will still operate the parts in ratio to the rate of rotation of the rear axle regardless of the relatively lower rate of speed of the motor.

It is to be particularly noted that by omitting the governor entirely, and directly connecting the rod 608, manual control of the lights in Figs. 11 and 12 is possible. I do not wish therefore to be limited to the automatic control.

It is also to be noted particularly that my governor device is adapted to be connected to the throttle of the engine, instead of or in addition to the signals and lights. It has heretofore been proposed to use automatic governors to insure constant speed of the engines of power driven vehicles, but were variable transmission gears are employed, the constant speed motor is not always desirable, and in fact is impracticable. With the method of calibration or adjustment which I have described in connection with Figs. 22 and 23, the action of my governor can be suitably modified, so that while the governor is driven directly from the motor, it will respond to changes in speed of the car.

It is to be understood that the illustration and description furnished herein are definitive and not restrictive, that is to say I am aware that many changes and modifications may be made without departing from the spirit of my invention, and all such changes and modifications are contemplated and reserved which fall fairly within the scope of the appended claims. For example, it is obvious that electric lights may be substituted for the burners described and shown in such figures as 5, 6, 7, 8, 11 and 13. The invention of Figs. 14 and 15 relates specifically to a gas burner, but in every other case where the burner is movable with respect to the projector, or where the light is controlled by controlling the source of supply, an electric lamp can be substituted for the gas light, and the current controlled instead of the gas, substituting a switch for a key or a variable resistance for a pressure reducer.

The arrangement of lights and signals herein described constitutes a system, and it is to be noted that signals described as applied to the rear of the car can also be used on the front, and vice versa. For example, it is part of my invention to place the "right" and "left" signals on the front of the vehicle so that those toward whom the vehicle is moving will be informed of the intentions of its driver. I have shown and described the rear signals as covered with shutters which lift through an angle of 90° to expose the signals. The front signals may advantageously be combined with the front or side lights, so that each side light would have above or below it a signal disk and lamp normally covered by a shutter. This disk or lamp may be of a distinctive color, such as green or red, and the shutter arranged so that it will turn through 180° so as to expose the signal and at the same time cover the side light. Thus the driver can indicate to those ahead, either by a manual control or by the same automatic control hereinbefore described for the rear signals, whether he is about to turn to the right or left, and all the other signals could be arranged if desired to show at the front instead of at the rear.

Many other changes will occur to those skilled in the art, and the specification is to be read so as to include them.

Having thus described my invention what I claim and desire to secure by Letters Patent is:

1. In a motor vehicle, an automatic governor, means to drive the same from the motor of the vehicle, a single calibrating spring for said governor, control means actuated by said governor, and means controlled by the changed speed or transmission gears for varying the tension of said calibrating spring in proportion to the modification in the ratio of the power transmission between the motor and the driving wheels of the car.

2. In a motor vehicle, control means, an automatic governor comprising a rotary body 300 having its long axis normally at a small angle from the axis of rotation, means connecting said rotary body to the control means, resilient compression means (326), and a calibrating device for modifying the action of the governor at different speeds of the car, comprising a movable abutment 388 for said compression device, a control member 395 adapted to be acted on by the speed or gear changing lever (450), and a connecting rod (387) extending between said control member (395) and said movable abutment 388.

3. A head light for vehicles comprising a casing, a light source, a projecting reflector arranged with the light source in its focus, and a shield pivoted within the casing eccentrically to the light source, with means tending normally to rotate said shield into position between the light source and the projector, and means responsive to changes of speed of the vehicle, for turning said shield out of its normal position.

4. A head light for vehicles comprising a casing, a light source, a projecting reflector arranged with the light source on its focus, and a shield pivoted within the casing eccentrically to the light source, with means tending normally to rotate said shield into position between the light source and the projector, and an automatic governor responsive to changes in speed of the vehicle acting at predetermined speeds only, to turn said shield out of its normal position.

5. A head light for vehicles comprising a casing, a light source, a projecting reflector therefor, a translucent shield adapted to be interposed at will between the light and the projector, and a plane shield adapted at will to be interposed between the light and the translucent shield.

6. A head light for vehicles comprising a casing, a light source, a projecting reflector therefor, a translucent shield adapted to be interposed at will between the light and the projector, and a plane reflecting shield adapted to be interposed between the light and the translucent shield, whereby varying degrees in intensity of the light projected may be obtained.

7. A head light for vehicles comprising a casing, a light source, a projecting reflector therefor, and a plane reflecting shield mounted to be interposed between the light and the projector, and means responsive to changes in speed of the vehicle for moving said shield into and out of position.

8. A head light for vehicles comprising a casing, a light source, a projecting reflector therefor, and a plane reflecting shield mounted to be interposed between the light and the projector, and an automatic governor responsive to speed changes in the vehicle, and acting at predetermined speeds only to move said shield into and out of position.

9. In a lighting system for vehicles, a governor comprising the following instrumentalities: a pivoted body adapted to be rotated around a fixed center, and normally occupying a position with its long axis at a small angle from the axis of rotation, means for driving the same from a moving part of the vehicle, and at a speed bearing a definite relation to the speed of the vehicle, a link actuated by the said governor in increasing its angle of inclination with increased speed of rotation, a cross head adapted to be moved by said link against a predetermined resistance, a sliding member controlled by one end of the cross head, and a trip lever for said sliding member adapted to hold the same until after a predetermined travel of the cross head, whereby the governor may pass through a predetermined angle before the sliding member will operate.

10. In a lighting system for vehicles, a governor comprising a driven rotating body normally having its long axis inclined at a small angle with the axis of rotation, a cross head 307, 308 connected to be moved by said rotating body as it changes its angle of inclination by increase in speed of rotation, a sliding control rod 309 carrying a collar 311, a compression spring 313 on the rod between said collar and the cross head 308, and a trip lever 314 adapted to engage said collar and hold the rod 309 against movement until the cross head has reached a predetermined position and tripped the lever 314, whereby movement of the control rod can be produced at any desired speed.

11. In a lighting system for vehicles, a governor comprising a driven rotating body normally having its long axis inclined at a small angle with the axis of rotation, a cross head 307, 308 connected to be moved by said rotating body as it changes its angle of inclination by increase in speed of rotation, a sliding control rod as 309, a pair of collars 310 and 311 fixed on said rod, a pair of springs 312 and 313 between said collars and the cross head, a pair of trip levers 314 and 319 adapted to engage said collars at opposite ends of the travel of the rod, and hold the same to compress the respective springs 312 and 313 until the cross head has traveled a predetermined distance in one direction or the other, whereby the operation of the control rod is produced after a predetermined and definite change in the speed only.

In testimony whereof I affix my signature.

WILLIAMS GRANT MILLIGAN.